US008322060B2

(12) United States Patent
Parizek et al.

(10) Patent No.: US 8,322,060 B2
(45) Date of Patent: Dec. 4, 2012

(54) RETRACTABLE TWO-SIDED BANNER STAND

(75) Inventors: Scott Parizek, Lakeville, MN (US); Curtis H. Lindblom, Oakdale, MN (US)

(73) Assignee: Skyline Displays, Inc., Eagan, MN (US)

( * ) Notice: Subject to any disclaimer, the term of this patent is extended or adjusted under 35 U.S.C. 154(b) by 155 days.

(21) Appl. No.: 12/691,486

(22) Filed: Jan. 21, 2010

(65) Prior Publication Data

US 2010/0180481 A1 Jul. 22, 2010

Related U.S. Application Data

(60) Provisional application No. 61/205,660, filed on Jan. 21, 2009.

(51) Int. Cl.
*G09F 15/00* (2006.01)
*G09F 17/00* (2006.01)
*G09F 7/00* (2006.01)
*G09F 15/02* (2006.01)
*G03B 21/56* (2006.01)
*G03B 21/60* (2006.01)

(52) U.S. Cl. ................ 40/610; 40/604; 40/603; 40/605; 40/607.01; 40/607.1; 359/453; 359/443; 160/135; 160/351; 248/127; 248/460; 248/159

(58) Field of Classification Search ............ 40/603–605, 40/607.1, 607.01, 607.04, 610; 248/127, 248/159, 460; 359/461, 443; 160/135, 351, 160/309
See application file for complete search history.

(56) References Cited

U.S. PATENT DOCUMENTS 638,434 A 12/1899 Woodman
4,288,937 A 9/1981 Virsen
4,700,498 A 10/1987 Perutz et al.
5,581,401 A * 12/1996 Takamoto et al. ............ 359/443
D391,298 S 2/1998 Johnson et al.
5,798,861 A 8/1998 Doat
6,370,803 B1 4/2002 Burquest
D468,362 S 1/2003 Zarelius
6,571,496 B2 * 6/2003 Zarelius .......................... 40/514
6,643,966 B2 11/2003 Schmitt (Continued)

OTHER PUBLICATIONS

Application and File history for U.S. Appl. No. 29/346,215, filed Oct. 28, 2009. Inventors: Dixon Gimpel et al.

(Continued)

*Primary Examiner* — Lesley D Morris
*Assistant Examiner* — Syed A Islam
(74) *Attorney, Agent, or Firm* — Patterson Thuente Christensen Pedersen, P.A.

(57) ABSTRACT

A retractable double-sided banner stand has a base, two upright posts, a crossbar, and a single banner with graphic image(s) disposed on both sides of the banner. The base generally includes a housing, two housing end cap assemblies, a single core, and a retracting mechanism. The banner is wound around the core, and the retracting mechanism unwinds and winds the banner with respect to the core. The leading edge of the banner is attached to the crossbar, which is wider than the width of the banner. The banner stand has an erect upright mode for displaying the images(s), and a collapsed mode for transporting the banner stand. In the erect mode, the upright posts are retained in the base by means of a quick-release locking mechanism, the banner extends upwardly from the base, and the crossbar engages with, and is supported by, the upper portion of each of the upright posts.

11 Claims, 19 Drawing Sheets

U.S. PATENT DOCUMENTS

| | | | |
|---|---|---|---|
| 6,718,669 | B1 | 4/2004 | Hayes |
| 7,237,350 | B1 | 7/2007 | Zarelius |
| 7,337,567 | B2 | 3/2008 | Fritsche et al. |
| D578,574 | S | 10/2008 | Lundgren |
| D598,501 | S | 8/2009 | Merner et al. |
| D608,830 | S | 1/2010 | Taylor et al. |
| D608,831 | S | 1/2010 | Taylor et al. |
| D611,102 | S | 3/2010 | Taylor et al. |
| D613,798 | S | 4/2010 | Taylor et al. |
| D616,944 | S | 6/2010 | Taylor et al. |
| D620,529 | S | 7/2010 | Taylor et al. |
| D620,530 | S | 7/2010 | Taylor et al. |
| 2002/0121034 | A1 | 9/2002 | Schmitt |
| 2005/0166430 | A1 | 8/2005 | Zarelius |
| 2006/0216686 | A1 | 9/2006 | McComb et al. |
| 2007/0257170 | A1 | 11/2007 | Whittemore et al. |
| 2009/0056184 | A1 | 3/2009 | Fritsche et al. |
| 2010/0050489 | A1 | 3/2010 | Merner et al. |
| 2010/0139135 | A1 | 6/2010 | Taylor et al. |
| 2010/0146832 | A1 | 6/2010 | Gimpel et al. |

OTHER PUBLICATIONS

Application and File history for U.S. Appl. No. 29/346,216, filed Oct. 28, 2009. Inventors: Dixon Gimpel et al.

Application and File history for U.S. Appl. No. 29/346,217, filed Oct. 28, 2009. Inventors: Dixon Gimpel et al.

Application and File history for U.S. Appl. No. 12/607,920, filed Jan. 21, 2010. Inventors: Scott Parizek et al.

* cited by examiner

RETRACTABLE TWO-SIDED BANNER STAND

This application claims the benefit of priority based on U.S. Provisional Application No. 61/205,660, filed on Jan. 21, 2009, the disclosures of which, including the appendix, is incorporated herein by reference in its entirety

FIELD OF THE INVENTION

This invention relates to free standing and readily dissassembleable graphic displays such as those used for trade shows. More particularly, this invention relates to retractable banner stands.

BACKGROUND OF THE INVENTION

Retractable banner stands are typically used to support and display a relatively large flexible sign or banner. These stands are widely used in reception areas, trade shows, museums, art exhibits, academic and research society meetings, advertising displays, and other areas in which visual information is temporarily displayed. A flexible sign or banner is extended upwardly from a floor-based housing and a post extending from the housing is used to maintain the display banner extended and upright. The banner is wound on a core that is disposed within the housing. The ends of the housing typically comprises two metal plates.

Retractable banner stands are also collapsible, as typical uses of these stands dictates that they be easily and quickly erected, easily and quickly collapsed, and light-weight and compact, and thus easily transported and stored. In many cases, it is desirable that one person, working alone, be capable of simply and quickly erecting, collapsing, and transporting a retractable banner stand.

The flexible sign or banner displayed by retractable banner stands have graphical images disposed thereon, typically on one side. Where it is desirable to view graphical images from both sides of a banner stand, it is known to connect two banner stands together, each with the same size banners, so that the graphic image side of each banner face outwardly. This can be accomplished by simply connecting two housings together and using a single post for supporting both banners. It is also known to have two banners on two different cores extend from a single housing unit with a single post positioned in the middle of the housing for supporting both banners. These double-sided banner stands are typically about twice as bulky and twice as heavy as a single-sided banner stand.

It would be advantageous to provide a retractable banner stand that permitted graphical images to be viewed from both sides of the banner stand, without the additional bulk and weight associated with double-sided banner stands.

SUMMARY OF THE INVENTION

An example embodiment of the present invention has a base, two upright posts, a crossbar, and a single banner with graphic image(s) disposed on both sides of the banner. The base generally includes a housing, two housing end cap assemblies, a single core, and a retracting mechanism. The banner is wound around the core, and the retracting mechanism unwinds and winds the banner with respect to the core. The leading edge of the banner is attached to the crossbar, which is wider than the width of the banner. The banner stand has an erect upright mode for displaying the images(s), and a collapsed mode for transporting the banner stand. In the erect mode, the upright posts are retained in the base by means of a quick-release locking mechanism, the banner extends upwardly from the base, and the crossbar engages with, and is supported by, the upper portion of each of the upright posts.

In certain embodiments of this invention, a retractable banner stand assembly has a base, two upright posts extending from the base and a single banner. The banner extends upwardly from the base and is supported by the upright posts. The base is placed on the floor, a table, or other horizontal surface. The base generally includes a housing, two housing end cap assemblies, a single core, a retracting mechanism, and a foot. The core and retracting mechanism are contained within the housing. The banner is wound around the core, and the retracting mechanism unwinds and winds the banner with respect to the core.

A feature and advantage of certain embodiments of this invention, is that the end cap assemblies provide multiple functions, particularly beyond the functions of the end plates in conventional retractable banner stands. The end caps are preferably formed from polymers that present "friendlier" engagement surfaces with floor surfaces than conventional metal end plates. Moreover, the end cap assemblies provide structure for accommodating the components of a quick-release locking mechanism, provide an aesthetically pleasing appearance and provide a recess for the ends of the crossbar when the banner is retracted.

A feature and advantage of certain embodiments of this invention is that the upright posts are retained in the base by means of two quick-release locking mechanisms, each contained within one of the housing end cap assemblies. In a typical retractable banner stand, setup and takedown by a single person is feasible. A person can install an upright post, and then extend the banner with one hand, while holding the post in place with their other hand and reverse the process during takedown. Once the banner is extended to the top of the post, the tension of the retracting mechanism holds all the components in their erected positions. In the case of the present invention, such setup and takedown techniques are not feasible, as there are two upright posts. The use of a locking mechanism permits a single person to quickly and simply setup or takedown the banner stand. The use of locking mechanisms facilitates the extension of the banner into the erected position, engaging the crossbar with the posts during the setup, disengaging the crossbar during takedown, without requiring the operator to attend to maintaining either of the upright posts in their respective sockets. The locking mechanism in certain embodiments, may be actuated by a push button or a pull lever, either by hand or by foot. In certain embodiments a spring actuated detent mechanism can lock the pole in until it is pulled out by a predetermined force to overcome the detent retention force.

A feature and advantage of certain embodiments of this invention is that the minimum distance between the posts is greater than the width of the banner providing a visual "framing" of the banner. Another feature and advantage of certain embodiments of this invention is that the upper (leading) edge of the retractable banner is attached to a crossbar which is wider than the width of the banner. The crossbar engages with, and is supported by, the upper portion of each of the upright posts to support the crossbar and the banner when the retractable banner stand is erected. This can be by means of a prong and hole engagement. In certain embodiments, the sockets for the poles can be positioned such that prongs on the cross bar fit therein when the banner is retracted.

A feature and advantage of certain embodiments of this invention is that the two housing end cap assemblies are located at either end of the housing. This results in a base that is wider than the typical base of a retractable banner stand;

each of the housing end cap assemblies adapted to contain a quick-release locking mechanism to retain an upright post.

A feature and advantage of certain embodiments of this invention is that the two housing end cap assemblies are footed. This elevates the housing off the floor, providing clearance for a swivel foot to be attached to the base.

A feature and advantage of certain embodiments of this invention is that an inverted U-shaped frame is attached to the base by way of the vertical legs outboard of the banner slot and with the horizontal leg removably connecting to the vertical legs and supporting the banner.

A feature and advantage of certain embodiments of this invention is that a single banner can display unobstructed views of a graphic image disposed on a first side of the banner, and unobstructed views of a graphic image disposed on the second side of the banner when viewed from a viewing position displaced from and directly in front of each of the respective sides of the banner.

A feature and advantage of certain embodiments of this invention is that the cross bar member supporting the banner can be elevated off of the vertical posts and the vertical posts are retained in their sockets by the retaining mechanism so as to not make disassembly difficult.

This application may also utilize aspects and components of the application Ser. No. 61/109,139, entitled Retractable Banner Stand, and utility application Ser. No. 12/607,920, both owned by the owner of the instant application and invention, and filed on Oct. 28, 2008, and Oct. 28, 2009 respectively. Said two applications are incorporated by reference herein. For example, the posts may extend from the feet as shown in said applications to provide the support for the banner with graphics on both sides. Similarly, the accessories clampable to the vertical posts of said application may also be suitable for clamping on the vertical posts of the instant application. Also, a suitable retracting mechanism is illustrated in the two applications.

BRIEF DESCRIPTION OF THE DRAWINGS

The invention may be more completely understood in consideration of the following detailed description of various embodiments of the invention in connection with the accompanying drawings, in which.

Figure 1A:
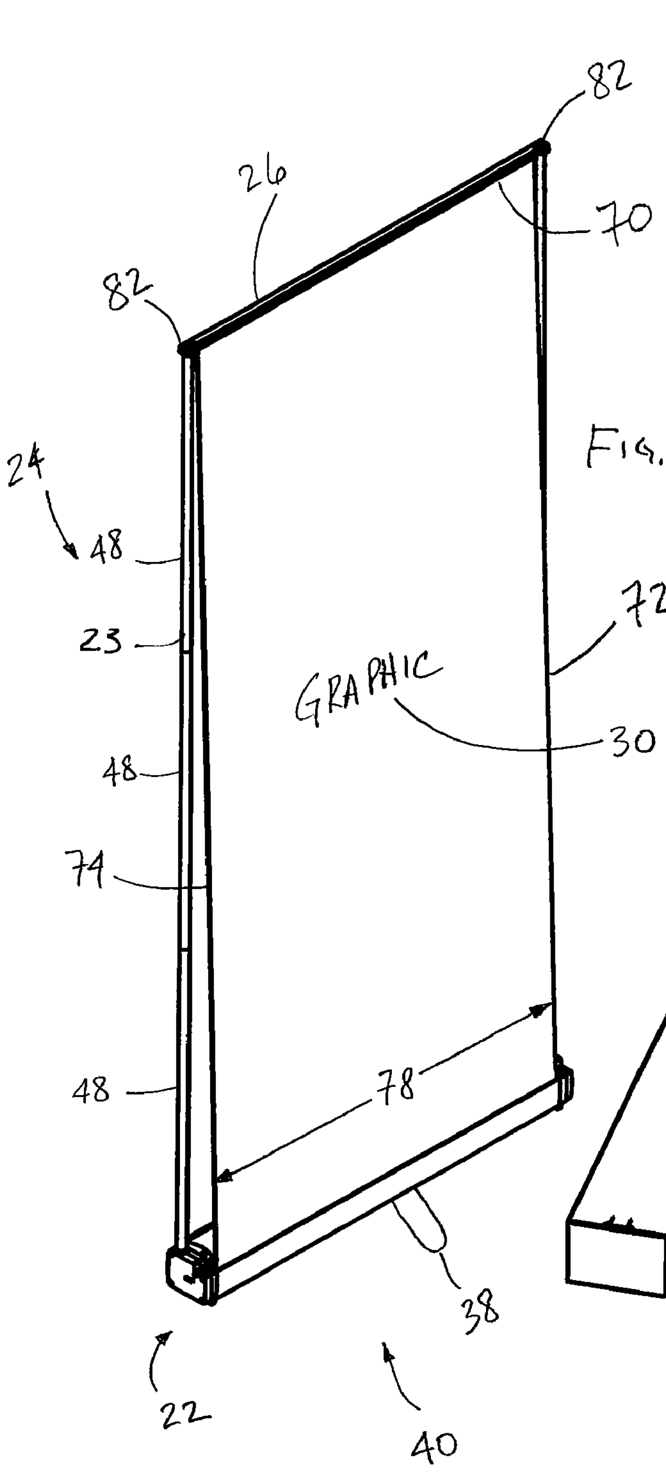
FIG. 1*a* is a perspective view of a double-sided retractable banner stand in an erect upright mode in accord with the invention herein.
Figure 1B:
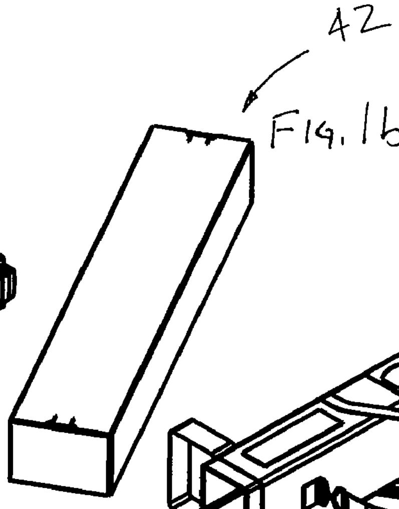
FIG. 1*b* is a perspective view of a double-sided retractable banner stand in a collapsed mode in accord with the invention herein.
Figure 1C:
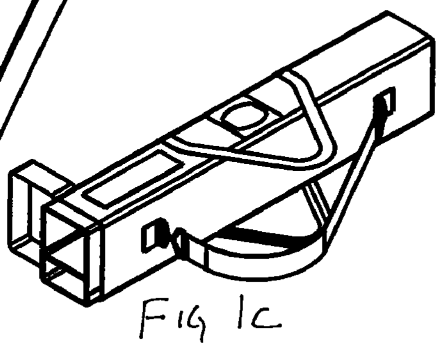
FIG. 1*c* is a perspective view of a storage/transportation case in accord with the invention herein.
Figure 2:
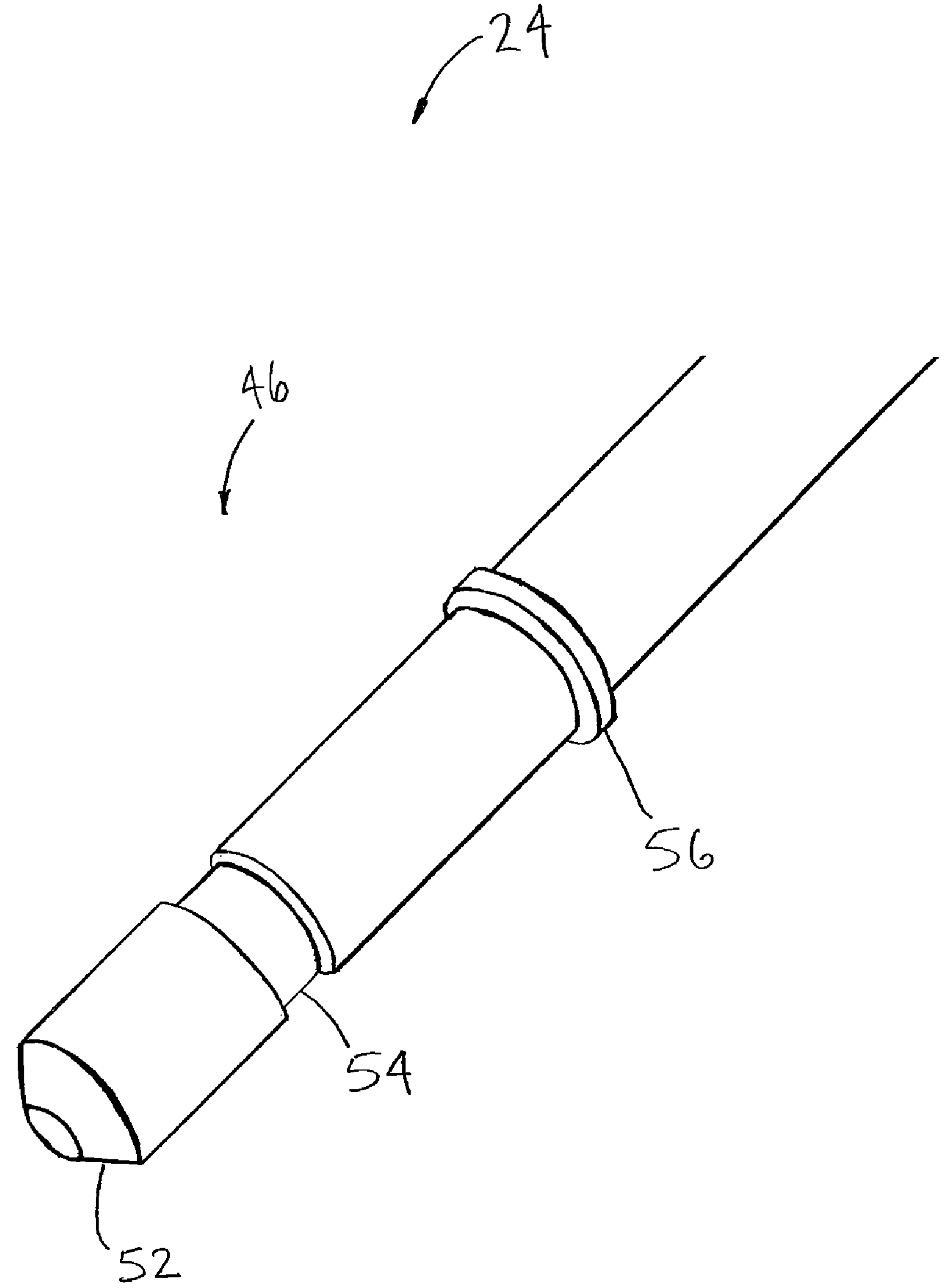
FIG. 2 is a perspective detail view of a lower locking portion of an upright post of the double-sided retractable banner stand depicted in FIG. 1*a;*

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1*a*, 5, 8, 17 and 18 a double-sided retractable banner stand 20 according to an embodiment of the present invention generally includes base 22, a banner support framework 23 having an inverted U-shape and comprising two upright posts 24 and a crossbar 26, and a single banner 28 with graphic image(s) 30 disposed on both sides of the banner. Base 22 generally includes housing 32, a single core 34, right housing end cap assembly 92, left housing end cap assembly 93, and retracting mechanism (not shown). Base 22 can also include one or more feet 38 for stabilizing banner stand 20 on a horizontal surface. Banner stand 20 has an erect upright mode 40 for displaying the images(s), and a collapsed mode 42 for transporting the banner stand.

Referring to FIGS. 1-4, each upright post 24 has upper portion 44, lower locking portion 46, and generally includes three segments 48 which are joined together by elastic bungee cord 50 which runs through the center of the post segments. In another embodiment (not illustrated), upright posts 24 can have segments which can be releasably connected. In yet another embodiment (not illustrated), upright posts 24 can have telescoping tube segments, which can be releasably interconnected for conversion from an erect upright mode to a collapsed mode.

Lower locking portion 46 is adapted to engage and lock with quick-release locking mechanism 36 (described below). Lower locking portion 46 has beveled tip 52, recessed portion 54, and collar 56. Upper portion 44 is adapted to engage with and support crossbar 26. Upper portion 44 has cavity 58.

Figure 17:
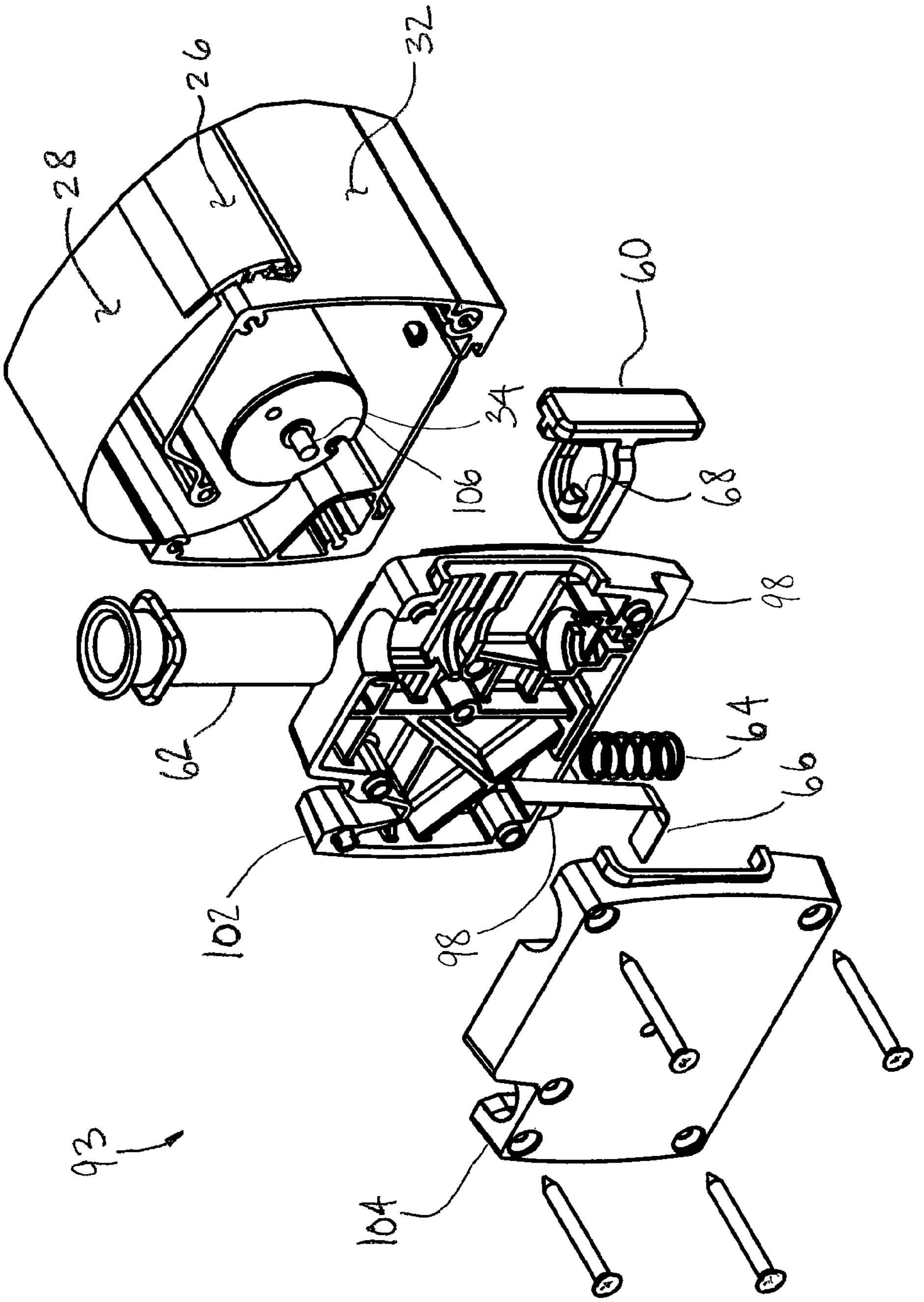
FIG. 17 is an exploded perspective view of the left-hand side housing end cap assembly depicted in FIG. 5.
Figure 18:
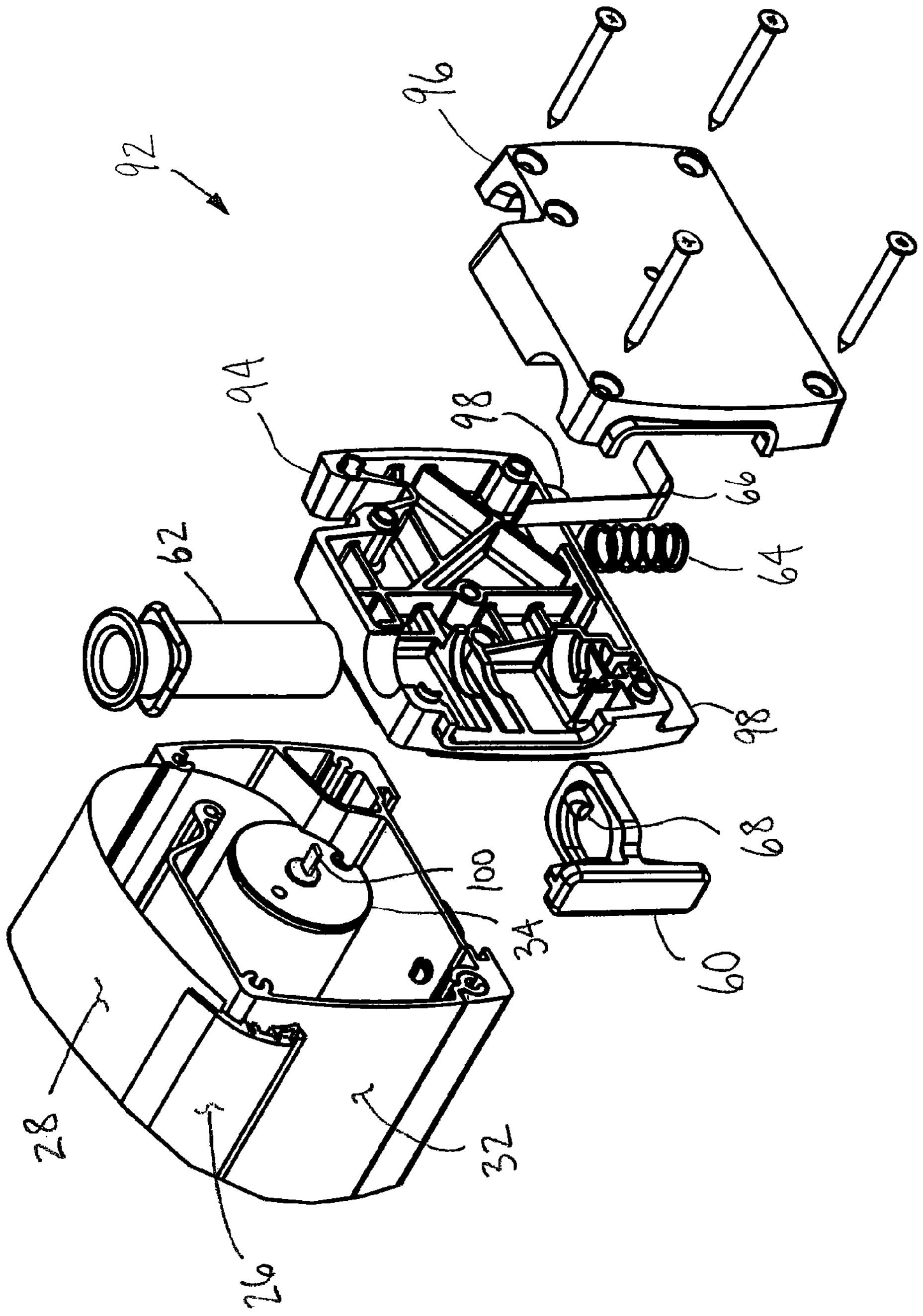
FIG. 18 is an exploded perspective view of the right-hand side housing end cap assembly depicted in FIG. 5.

Referring in particular to FIGS. 17 and 18, housing end cap assemblies 92, 93 generally include a right-hand side and a left-hand side; the fabrication and assembly of the left side is substantially a mirror image of the right side, with the exception of the core holding recess. Right side housing end cap assembly 92 generally includes quick-release locking mechanism 36, right inner piece 94, right end piece 96 and two end cap feet 98, forming a foot portion, illustrated as integral with inner pieces 94, 102 (described below). Right inner piece 94 is adapted to mate with the right-hand side of housing 32, and to accept non-rotating hub 100 of the retracting mechanism. Right inner piece 94 and right end piece 96 work together to house locking mechanism 36 (described below), and to receive prong 84 (described below) when the banner is retracted. Foot portions comprising two end cap feet 98 are formed as part of right inner piece 94. Right inner piece 94 and right end piece 96 can be assembled to the housing by way of any suitable fastener(s). Suitable fasteners include, but are not limited to, rivets, staples, screws, snap-together fittings, adhesive, or any other means.

Left side housing end cap assembly 93 generally includes quick-release locking mechanism 36, left inner piece 102, left end piece 104 and two end cap feet 98. Left inner piece 102 is substantially a mirror image of right inner piece 94, except that left inner piece 102 is adapted to accept rotating hub 106 of the retracting mechanism. Left end piece 104 is substantially a mirror image of right end piece 96. Except as detailed herein, the left side housing end cap assembly 93 is substantially a mirror image of the right side housing end cap assembly 92.

Figure 20:
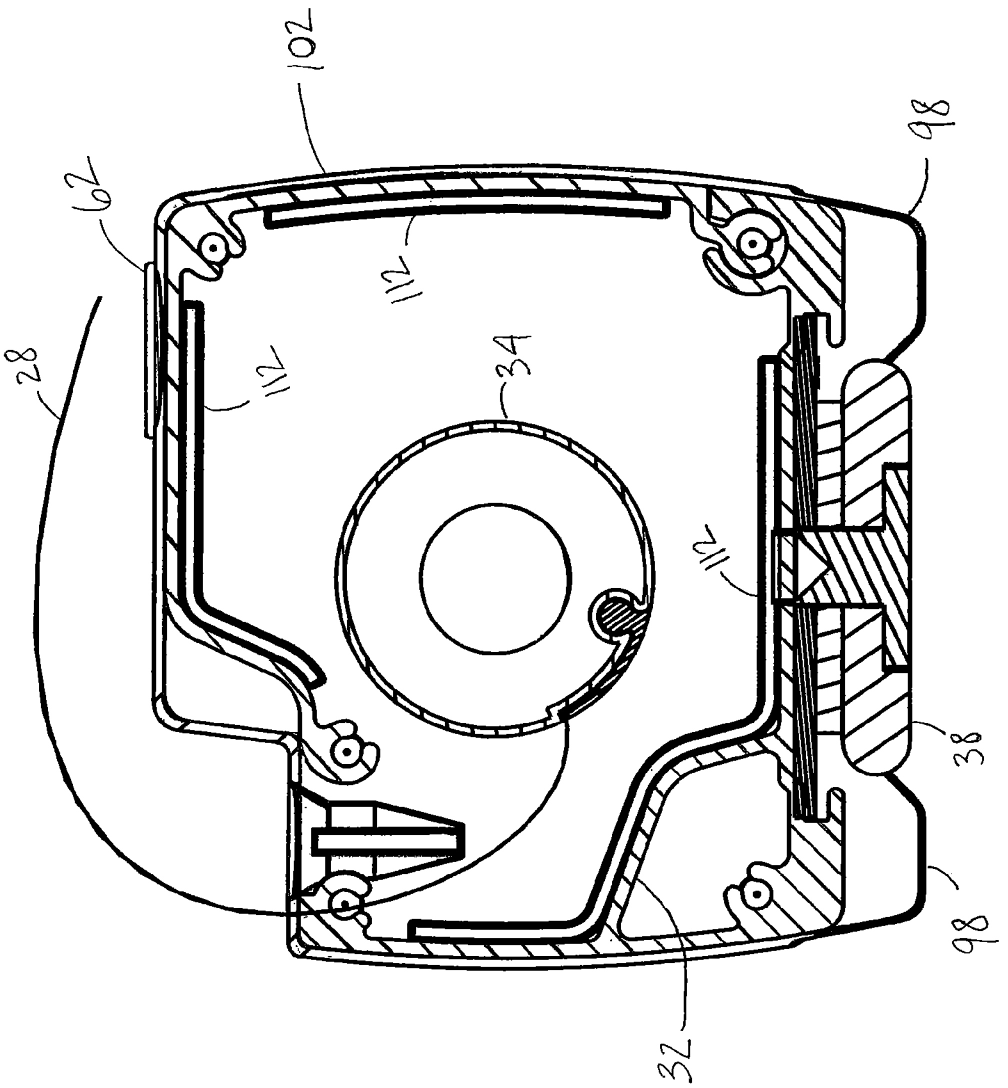
FIG. 20 is a section view taken along line 20-20 of FIG. 5 showing the housing, banner, foot, and left inner piece.

Referring to FIG. 20, which depicts housing 32, core 34 and foot 38 in a section view, and left inner piece 102 in a plan view. Left inner piece 102 has inner support structure 112 that is adapted to be fit in a close mating relation with and within housing 32 when left inner piece 102 is assembled onto housing 32. Inner support structure 112 works to retain left inner piece 102 onto housing 32 and to provide structural rigidity between housing 32 and left side housing end cap assembly 93. Right inner piece 94 has inner support structure that substantially mirrors that of left inner piece 102.

Figure 8:
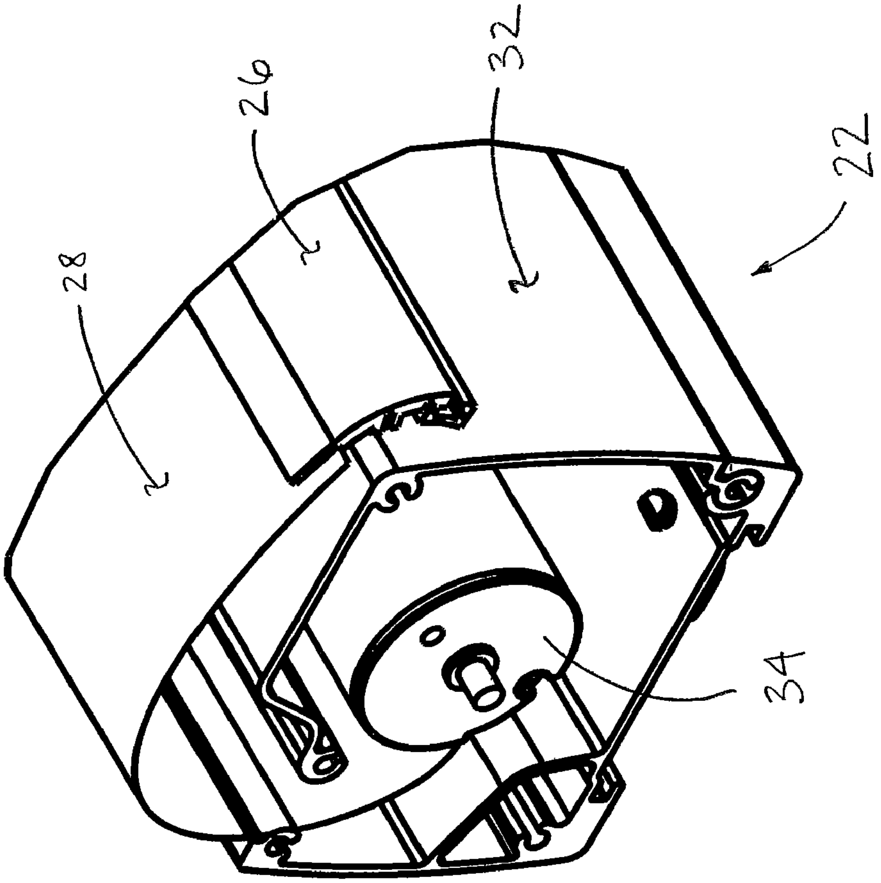
FIG. 8 is a cut-away perspective view of the base depicted in FIG. 6.
Figure 7:
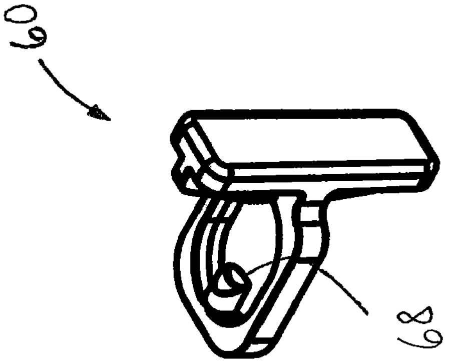
FIG. 7 is a perspective view of a lock button of the locking mechanism depicted in FIG. 6.
Figure 9B:
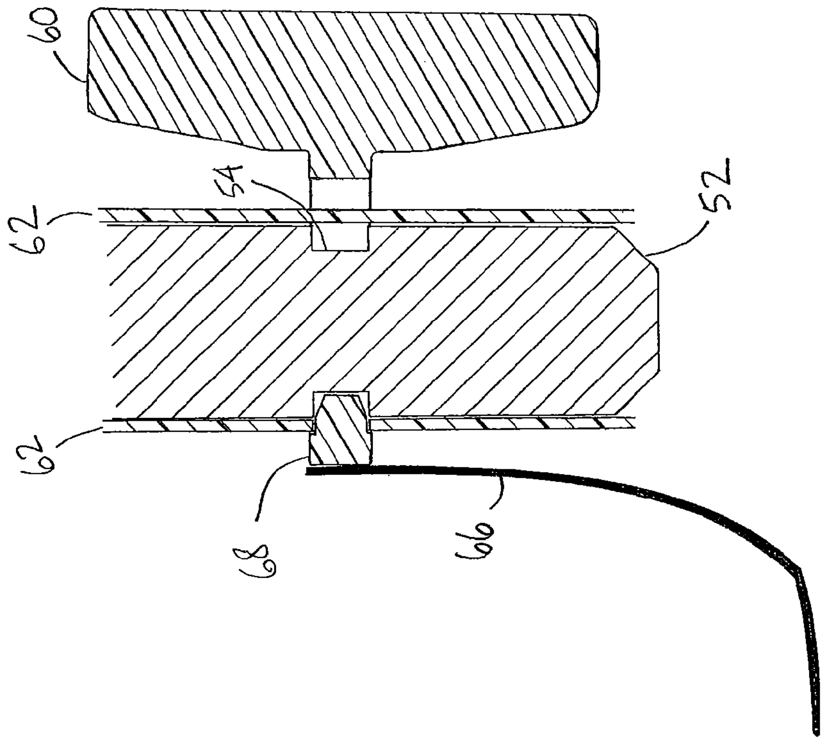
FIG. 9B is a partial section view taken along line 9B-9B of FIG. 5 showing the tab engaged with the upright post and the released lock button.
Figure 9A:
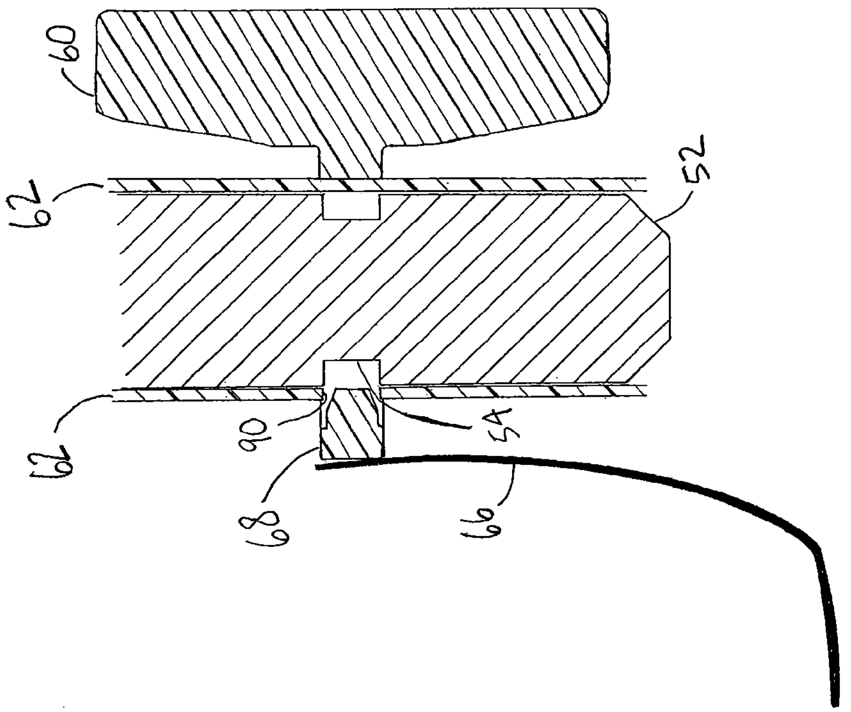
FIG. 9A is a partial section view taken along line 9A-9A of FIG. 5 showing the tab disengaged from the upright post and the depressed lock button.

Referring to FIGS. 6-9B, quick-release locking mechanism 36 generally includes lock button 60, socket 62, spring 64, and leaf spring 66. Lock button 60 generally includes tab 68 which engages with socket 62 via hole 90 on socket 62. Leaf spring is biased against lock button 60, such that tab 68 is urged to engage with socket 62. In operation, a user can insert upright post lower locking portion 46 into socket 62. As post 24 is inserted into socket 62, spring 64 is compressed and beveled tip 52 contacts tab 68, causing it to slide substantially out of the cavity of socket 62. This motion will be resisted by leaf spring 66, which will flex in opposition to the motion. Once the post is inserted far enough, recessed portion 54 will be positioned opposite tab 68 which will permit tab 68 to re-engage with socket 62 and to engage with recessed portion 54 due to the urging of leaf spring 66, as can be seen in FIG. 9B. Collar 56 contacts the socket opening such that the weight of post 24 can be transferred to the housing via socket 62, rather than by recess 54 contacting tab 68; however post 24 is retained ("locked") in socket 62 due to the engagement of tab 68 and recess 54. To remove post 24 from locking mechanism 36, a user can depress lock button 60 to flex leaf spring 66 and disengage tab 68 from recess 54, as can be seen in FIG. 9A.

Figure 6:
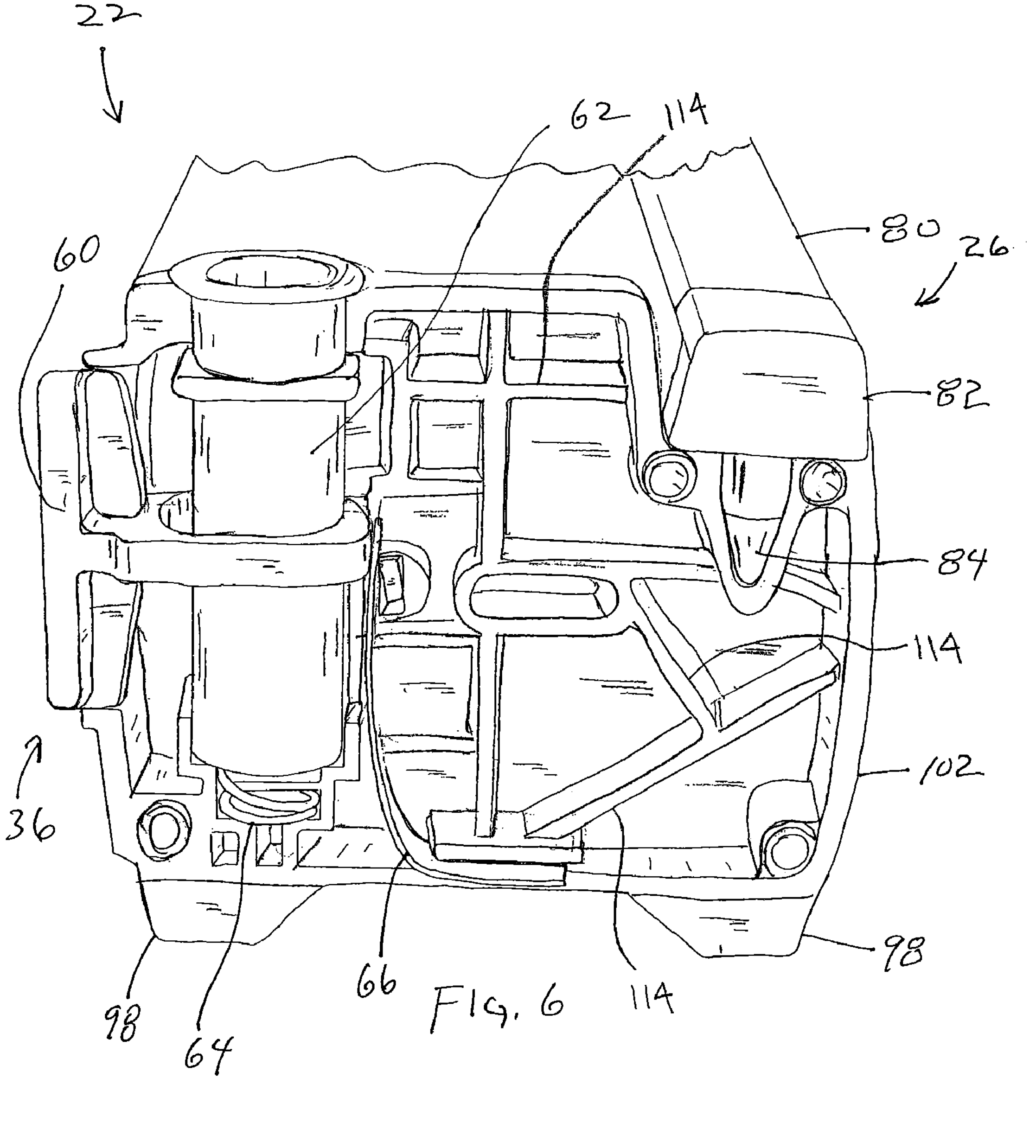
FIG. 6 is a simplified cut-away perspective end view of a base showing a locking mechanism of a housing end cap assembly depicted in FIG. 5.

Left inner piece 102 has rigid inner supports 114 as depicted in FIG. 6. Left end piece 104 has rigid inner supports that substantially mirror those of left inner piece 102.

Figure 10:
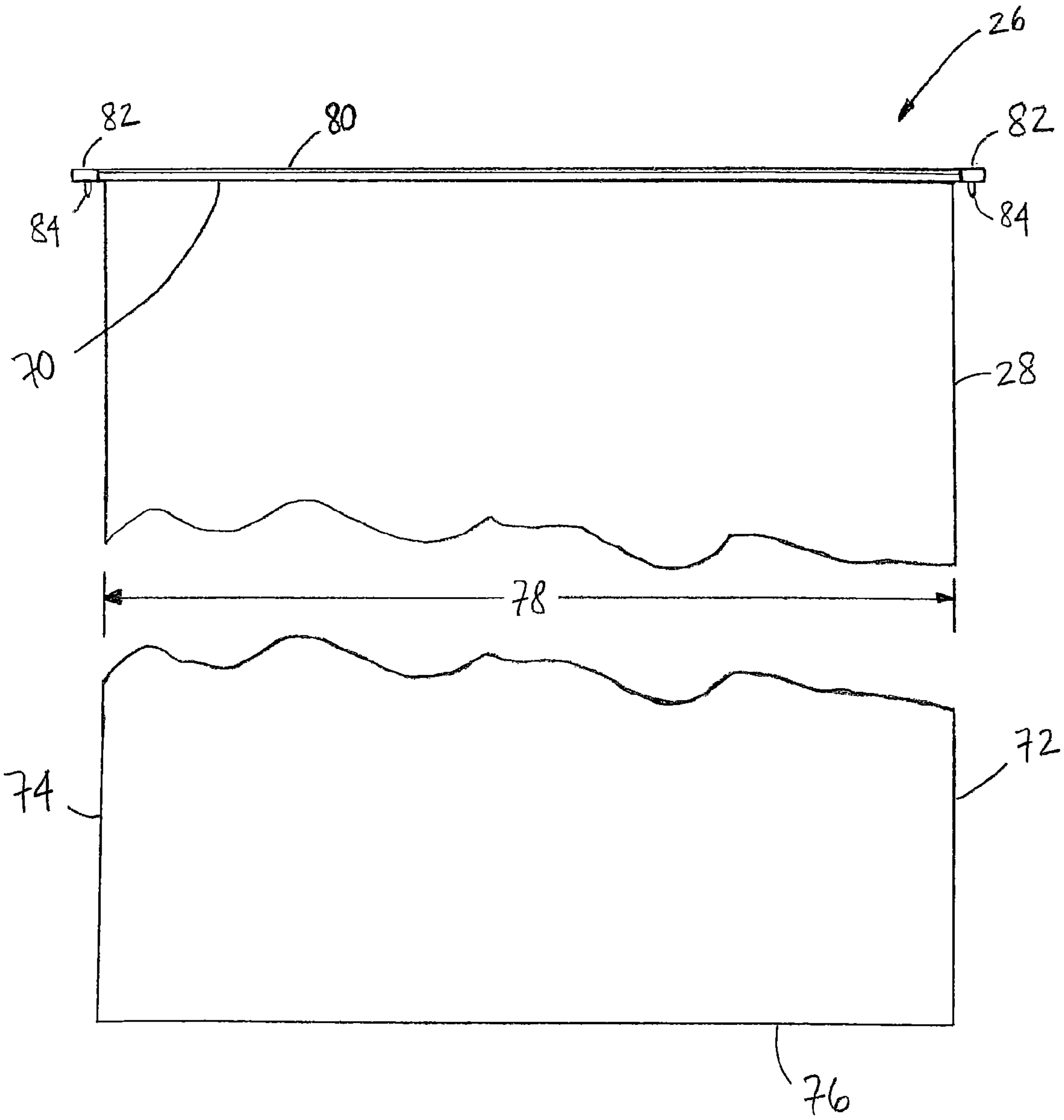
FIG. 10 is a broken front view of the banner and crossbar depicted in FIG. 1.
Figure 11:
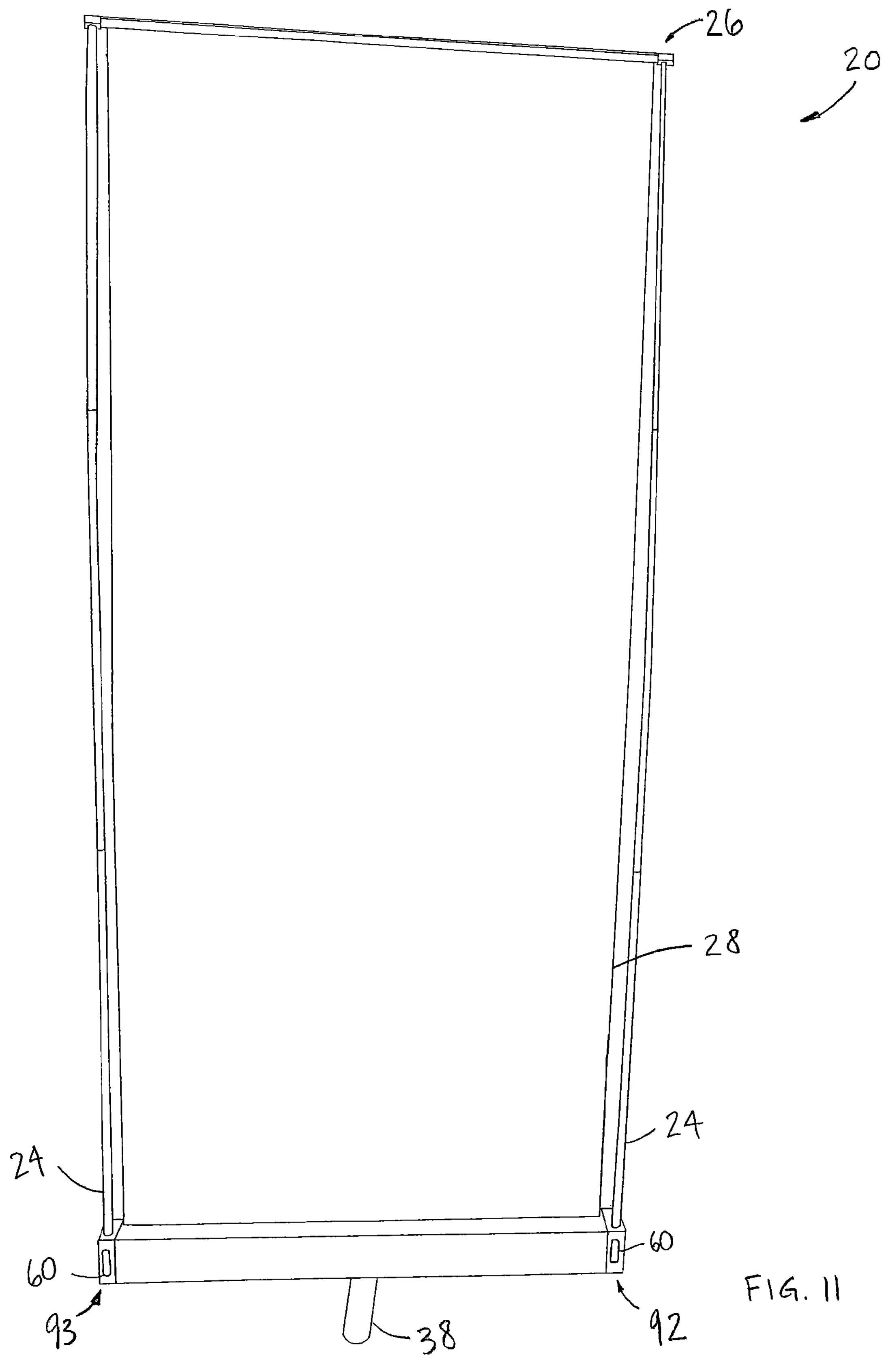
FIG. 11 is a perspective view, displace from and substantially directly in front of, a first side of the double-sided retractable banner stand depicted in FIG. 1.
Figure 12:
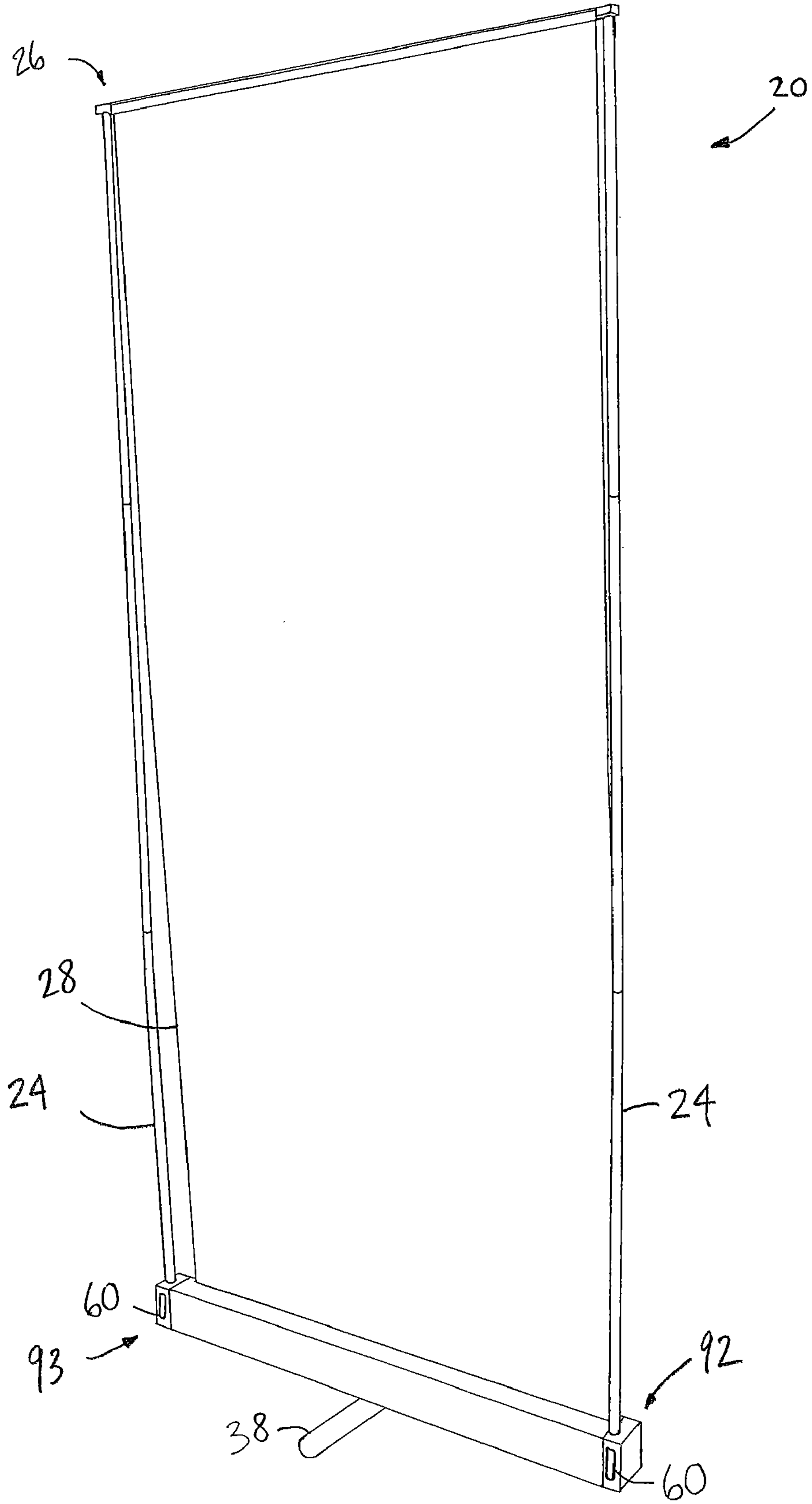
FIG. 12 is an angled front perspective view of a first side of the double-sided retractable banner stand depicted in FIG. 11.
Figure 13:
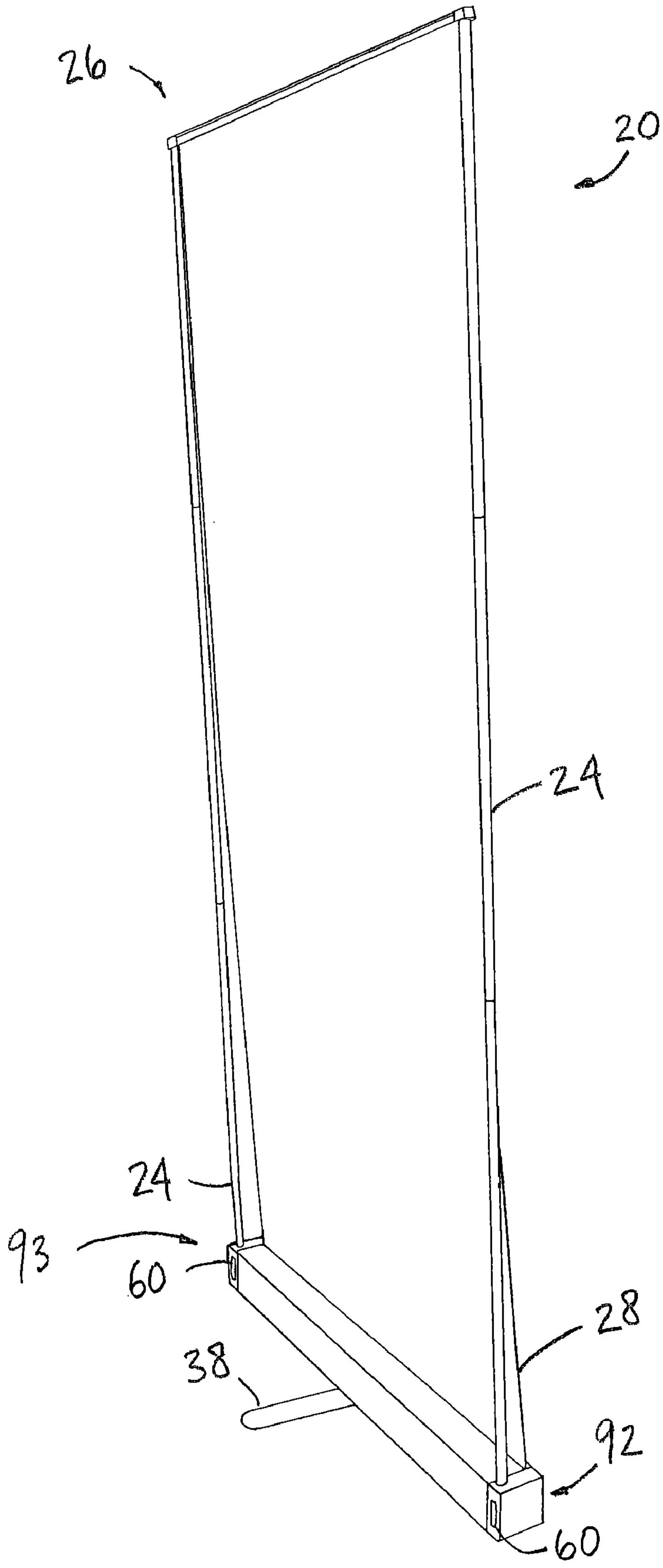
FIG. 13 is an acutely angled front perspective view of a first side of the double-sided retractable banner stand depicted in FIG. 12.
Figure 14:
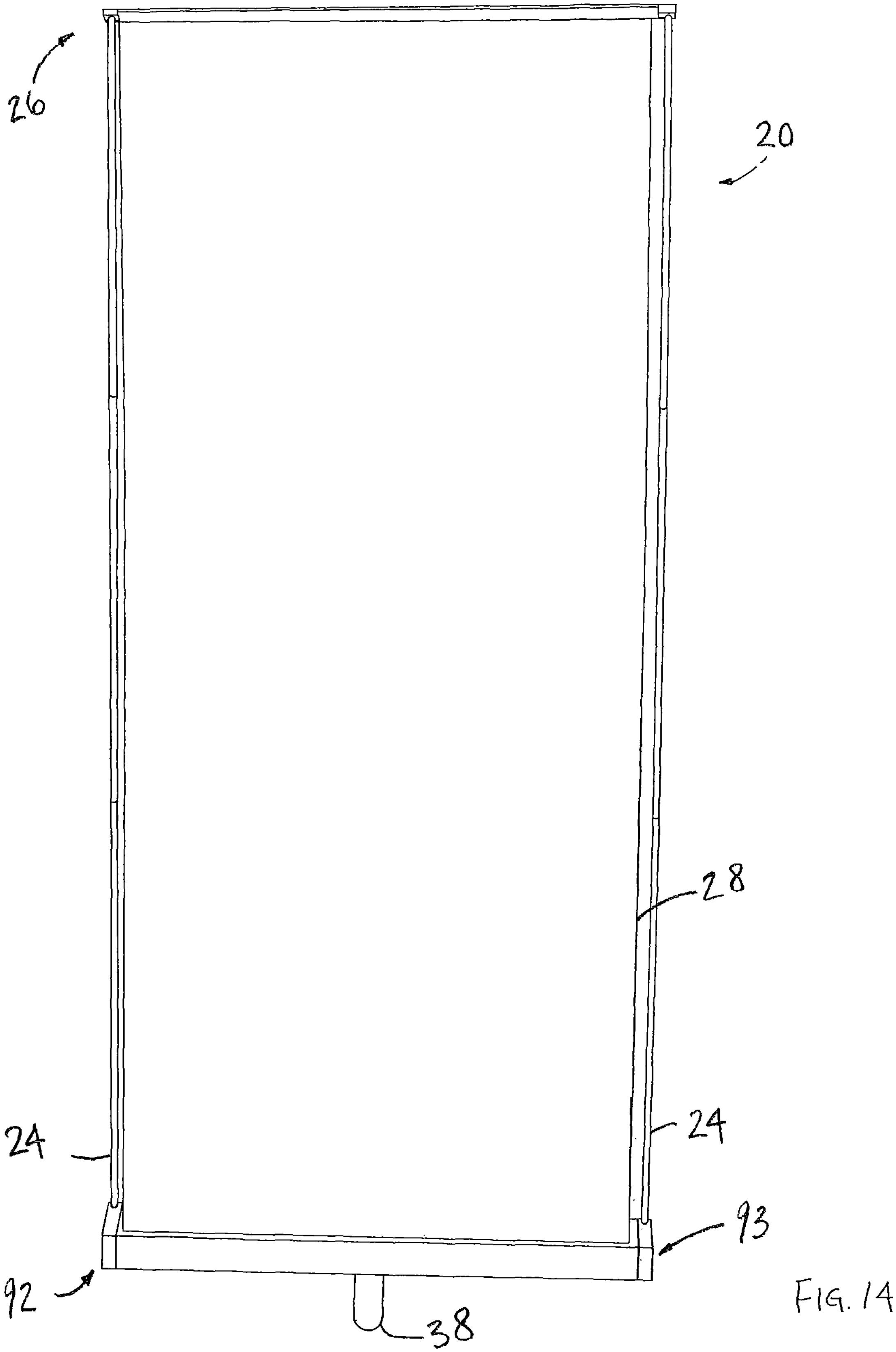
FIG. 14 is a perspective view, displace from and substantially directly in front of, a second side of the double-sided retractable banner stand depicted in FIG. 13.
Figure 15:
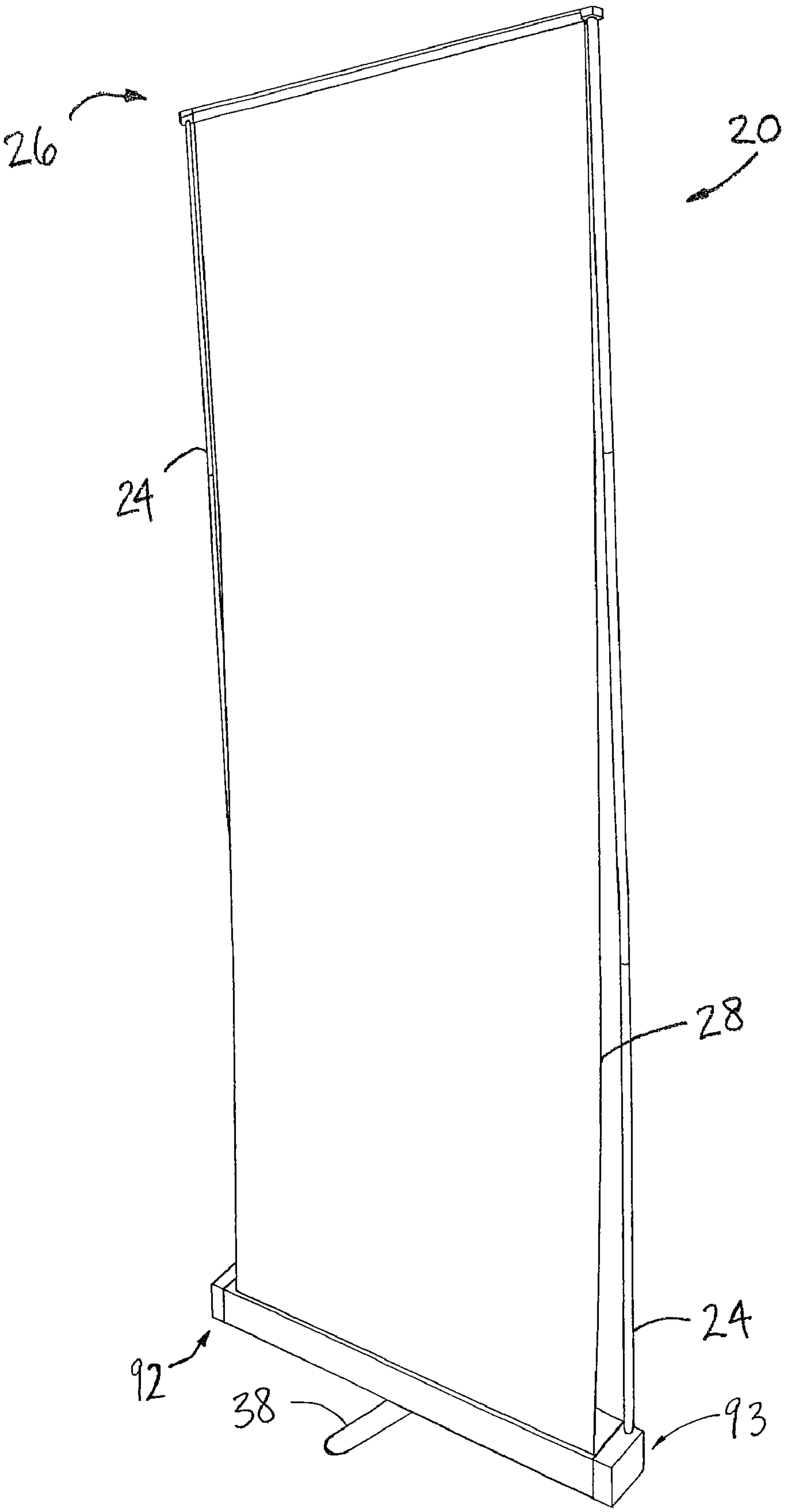
FIG. 15 is an angled front perspective view of a second side of the double-sided retractable banner stand depicted in FIG. 14.
Figure 16:
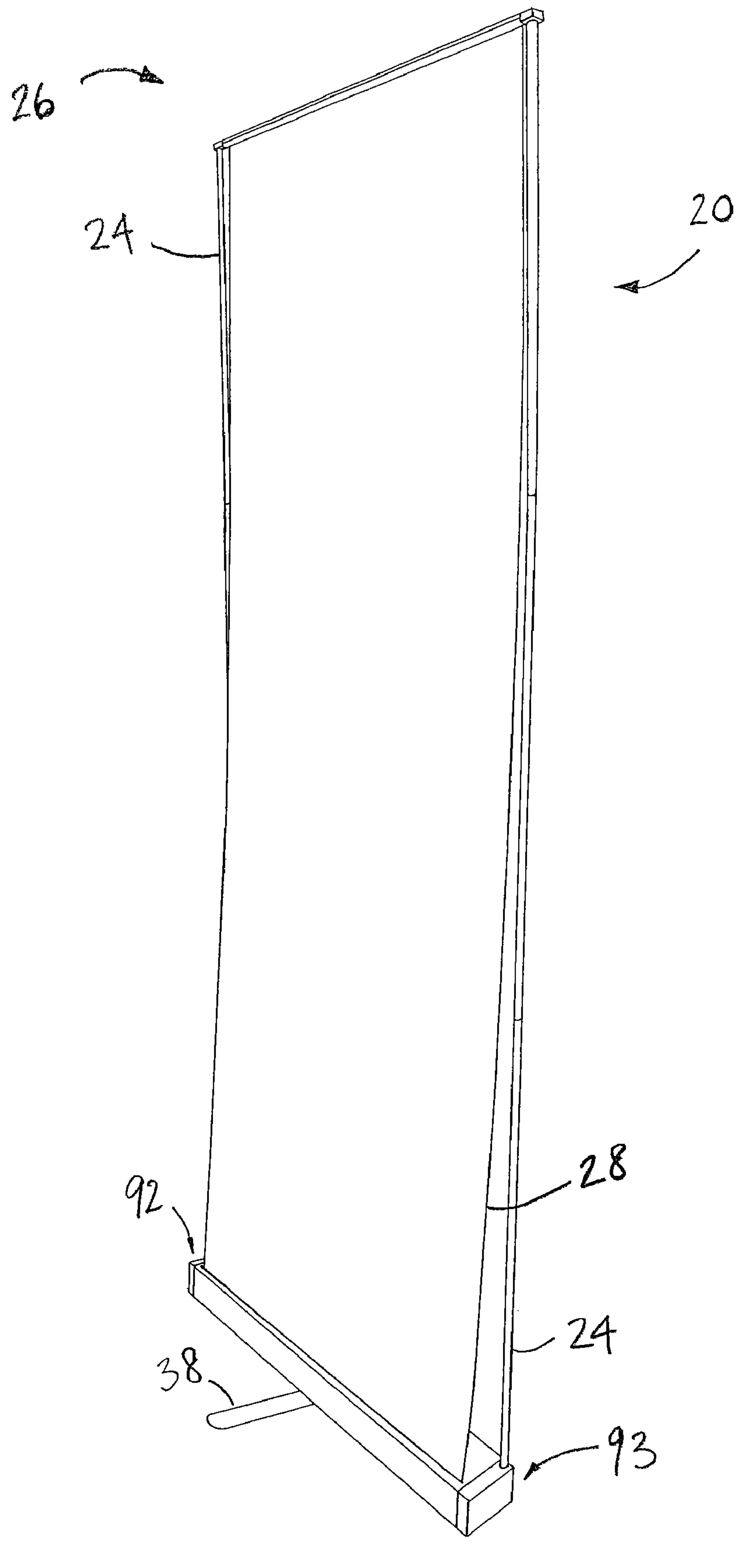
FIG. 16 is an acutely angled front perspective view of a second side of the double-sided retractable banner stand depicted in FIG. 15.

Referring to FIGS. 1*a* and 10, banner 28 is preferably fabricated using a flexible-foldable material such poplin, but can be made out a number of materials including, but not limited to, various textiles, polyplastic, and LYCRA®. Banner 28 has leading edge 70, right side edge 72, left side edge 74, trailing edge 76 and width 78. In certain embodiments, banner 28 is substantially rectangular, in other embodiments (not illustrated), banner 28 is non-rectangular, and can have, for example, convex-, concave- or hourglass-shaped side edges 72, 74. For non-rectangular banners, width 78 represents the widest horizontal dimension of the banner.

Figure 3:
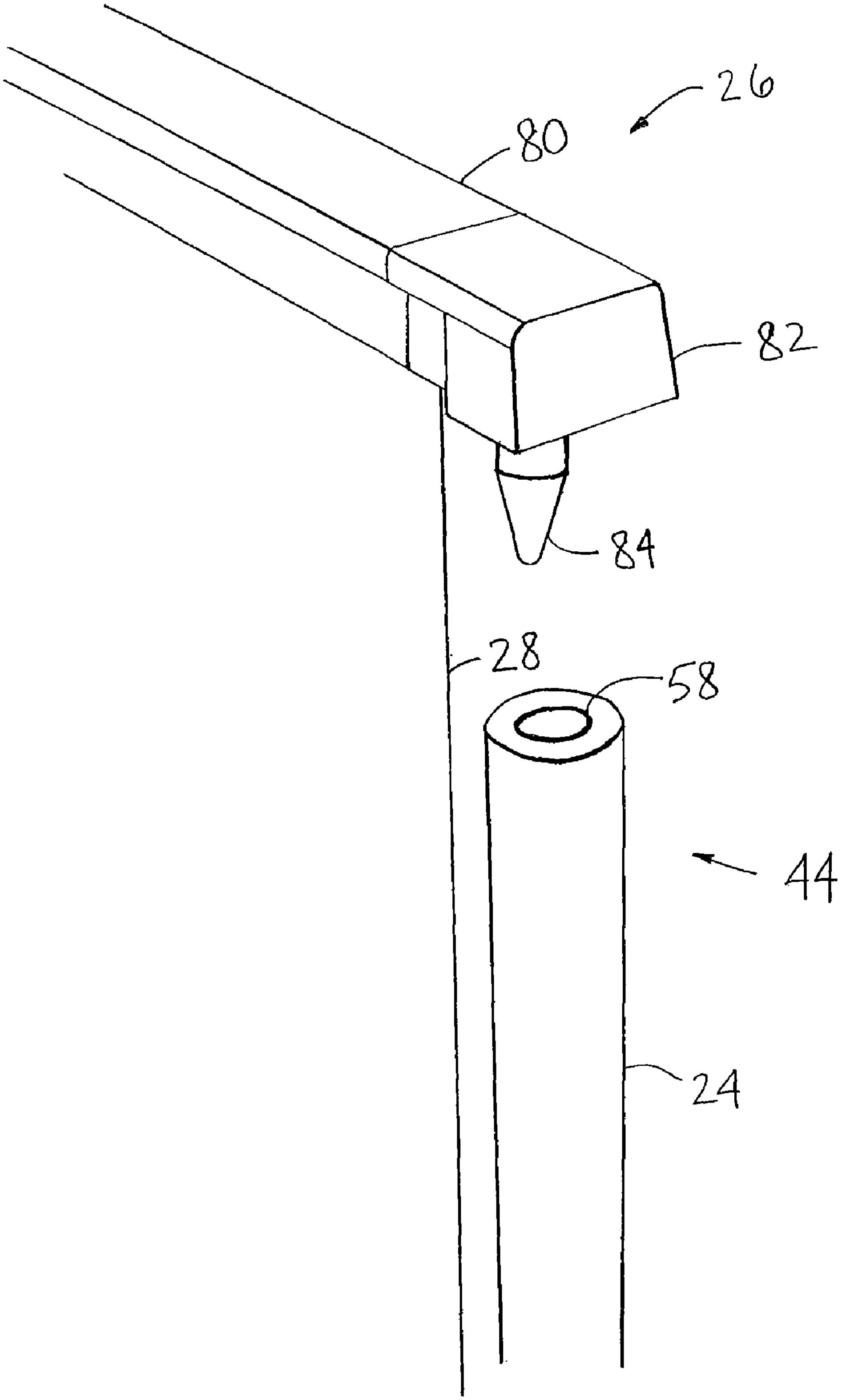
FIG. 3 is a perspective detail view of an upper portion of an upright post, a banner, and a crossbar of the double-sided retractable banner stand depicted in FIG. 1.
Figure 4:
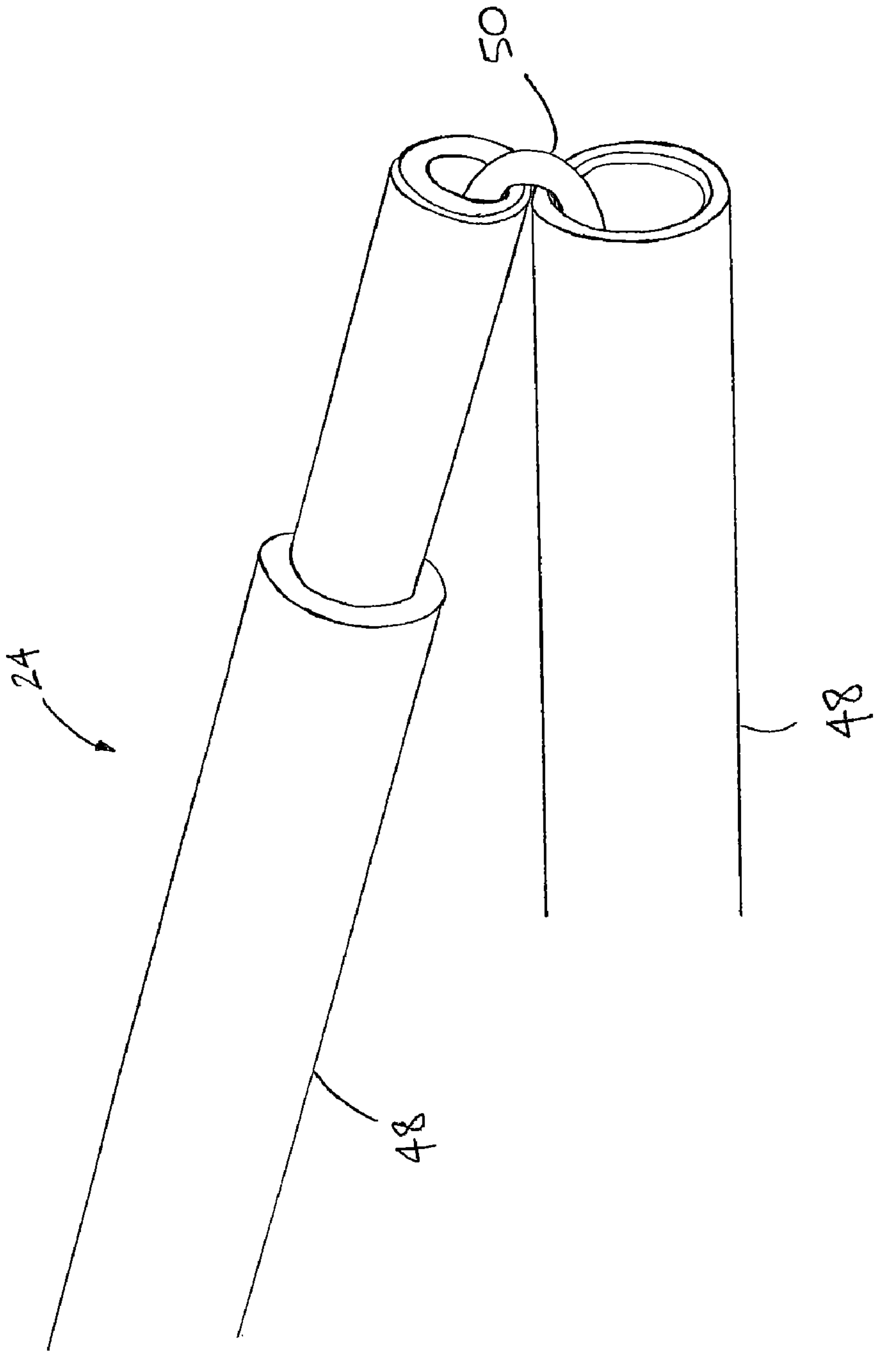
FIG. 4 is a perspective detail view of two disassembled post segments, showing an elastic bungee cord which runs through the center of the post segments, of the double-sided retractable banner stand depicted in FIG. 1.

Referring to FIGS. 3 and 10, crossbar 26 generally includes an elongated body 80 and two end caps 82. Crossbar 26 is attached to leading edge 70 of the banner by way of any suitable fastener(s). Suitable fasteners include, but are not limited to, tape, rivets, staples, screws, snaps, hook and loop fasteners, adhesive, or any other means. Elongated body 80 has a cross-sectional profile that substantially resembles a "T" although any profile that is suitable for attachment to banner 28 and for being grasped by a user can be used. Elongated body 80 can be a hollow extrusion formed from aluminum; end caps 82 can be plastic formed parts that are adapted to fit into the hollow portion of an extruded elongated body 80. End caps 82 each have a single prong 84 for engaging cavity 58. In other embodiments (not shown), end caps 82 can engage with upper portion 44 through the use of snaps, a hook and loop arrangement, magnets, hooks, or any other suitable means.

In one embodiment, leading edge 70 of the banner is adhered to one side of the lower part of the "T" extrusion, and transparent adhesive tape is used on both sides of leading edge 70 and elongated body 80 to further secure the attachment. In another embodiment (not shown), crossbar 26 can be releasably attached to leading edge 70 of the banner by way of any suitable fastener(s). Suitable fasteners include, but are not limited to, screws, snaps, hook and loop fasteners, or any other means.

Figure 19:
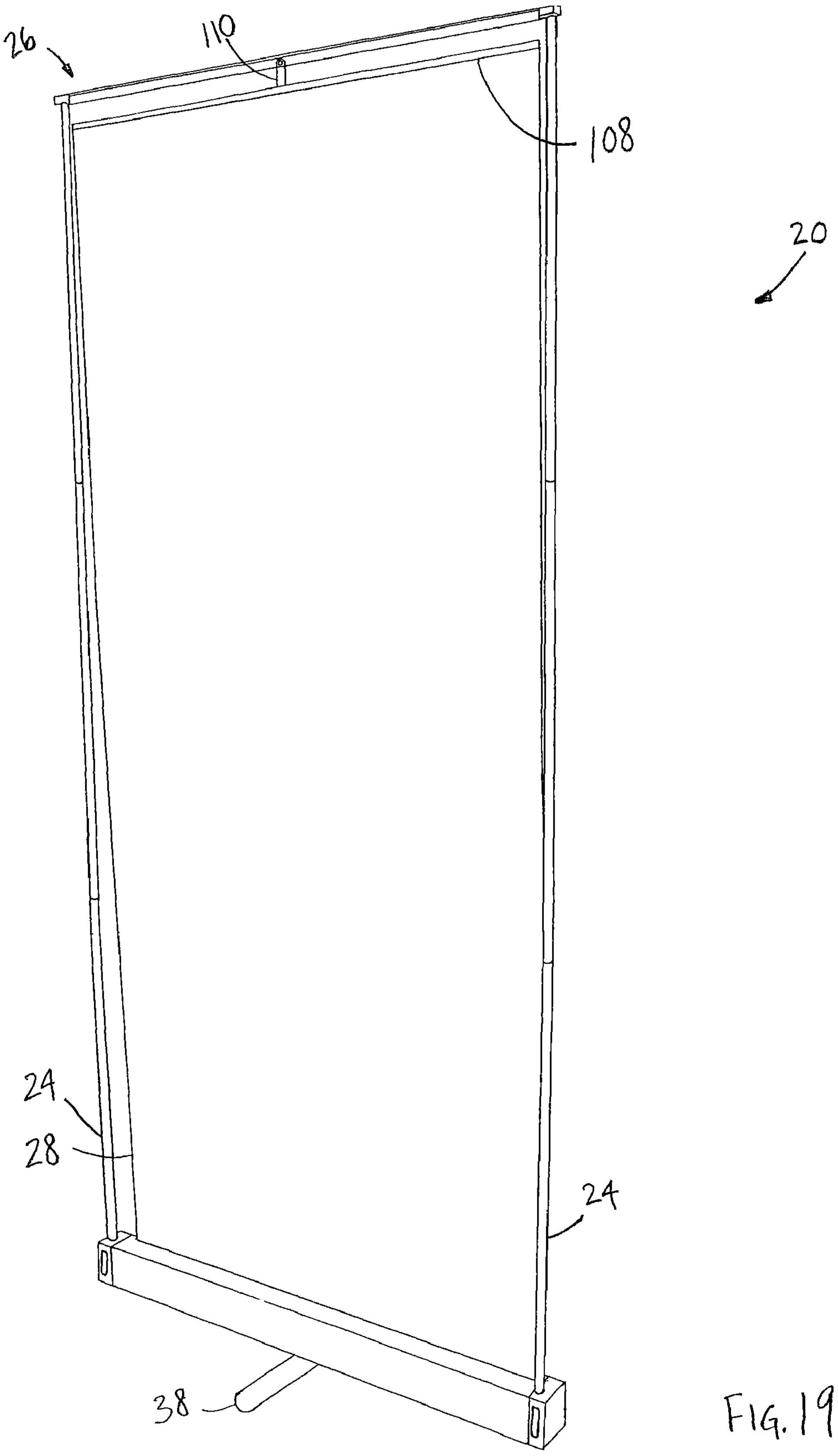
FIG. 19 is a perspective view of an alternate embodiment of a double-sided retractable banner stand in an erect upright mode.

Referring to FIG. 19, another embodiment of the double-sided retractable banner stand is depicted in an erect upright mode. Banner 28 is attached to horizontal leader bar 108 by way of any suitable fastener(s) in lieu of being attached to crossbar 26. Suitable fasteners include, but are not limited to, screws, snaps, hook and loop fasteners, or any other means. Horizontal leader bar 108 is attached to crossbar 26 by way of strap 110 which snaps to crossbar 26. Alternate attachment of horizontal leader bar 108 to crossbar 26 include, but are not limited to, one or more straps, ties, belts, tabs, hook and loop fasteners, or any other means.

Figure 5:
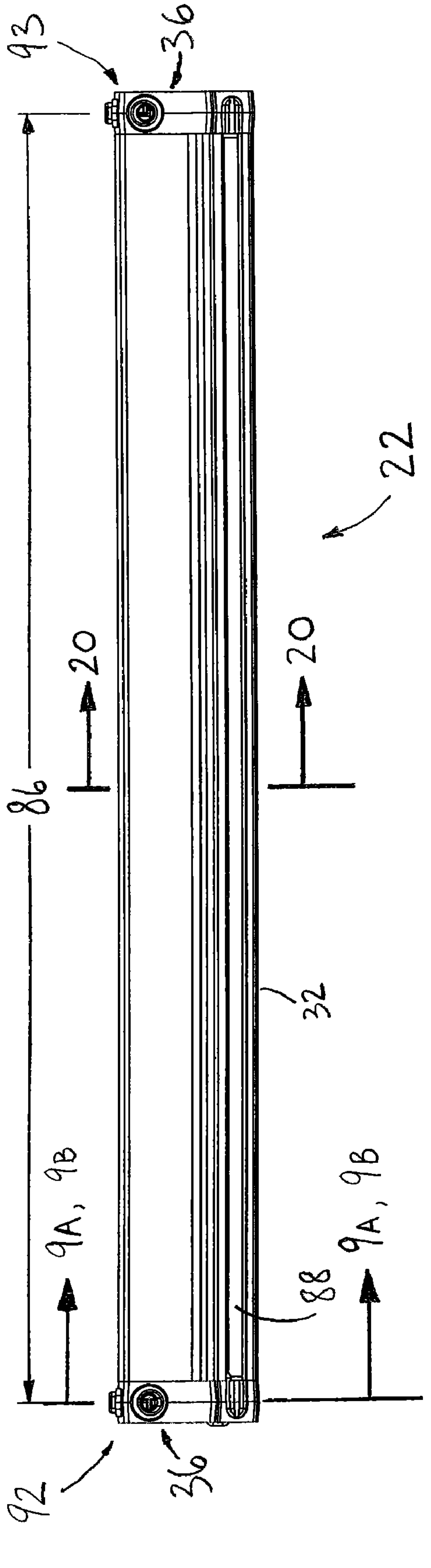
FIG. 5 is a top plan view of a base of the double-sided retractable banner stand depicted in FIG. 1.

Referring to FIGS. 5 and 10, locking mechanisms 36 are aligned within base 22 such that upright posts 24 are substantially vertical when retained in locking mechanism 36. Locking mechanisms 36 are positioned within base 22 such that distance 86 is greater than width 78. The distance between prongs 84 is substantially equal to width 86. In another embodiment (not illustrated), the overall width of crossbar 26 can be substantially the same as distance 86.

Referring now to FIGS. 5 and 8, housing 32 has a substantially square cross-sectional shape, and has slot 88 along the top surface. Slot 88 is long enough to accommodate width 78 of banner 28. Core 34 is enclosed within housing 32. Core 34 has a spring-biased retracting mechanism (not shown). Core 34 is substantially similar to other devices widely utilized with retractable banner stands. Trailing edge 76 is attached to core 34 by way of any suitable fastener(s). Suitable fasteners include, but are not limited to, tape, rivets, staples, screws, snaps, hook and loop fasteners, adhesive, or any other means. In another embodiment (not shown), trailing edge 76 can be releasably attached to core 34 by way of any suitable fastener(s). Suitable fasteners include, but are not limited to, screws, snaps, hook and loop fasteners, or any other means. Banner 28 is wound around core 34.

Trailing edge 76 may be attached directly to core 34 or through core connection mechanisms that allow replacement of banner 28 with a different banner.

In operation, a user can grasp crossbar 26 and pull banner 28 from housing 32 to display substantially all of graphic image(s) 30 disposed on both sides of the banner. The spring-biasing of the retracting mechanism of core 34 acts to urge banner 28 to be re-wound on core 34, and thus acts to provide a constant retracting force on banner 28. When this retracting force is unopposed, the spring-biasing of the retracting mechanism of core 34 acts to retract banner 28 through slot 88 into housing 32, winding the banner on the core.

Housing 32 can have horizontal surface engagement members such as feet 38 to provide stable support to banner stand 20 on a horizontal surface, such as a floor. Feet 38 are arranged so that they are substantially parallel to housing 32 when banner stand 20 is in the collapsed mode; when banner stand 20 is in the erect mode, feet 38 are arranged so that they are substantially perpendicular to housing 32, as depicted in FIGS. 11-16. End cap feet 98 elevate housing 32 from the floor and provide clearance for a swivel foot 38 to be attached to the base; end cap feet 98 also provide clearance between housing 32 and the floor such that an operator can simply rotate foot 38 from a parallel to the length of the housing position to a perpendicular position.

In another embodiment (not illustrated), feet 38 can be snapped or slid onto housing 32 and can be removed for transportation and storage.

In operation, banner stand 20 can be transformed from erect upright mode 40 to collapsed mode 42 by a single user. Banner stand 20 can also be transformed from collapsed mode 42 to erect upright mode 40 by a single user. A user can follow the following steps to transform banner stand 20 from erect upright mode 40 to collapsed mode 42: (a) grasp and pull up crossbar 26 so that prongs 84 disengage from cavities 58; (b) slowly release tension on crossbar 26 so that the spring-biasing of the retracting mechanism of core 34 acts to retract banner 28 through slot 88 into housing 32; (c) release crossbar 26 when it contacts housing 32; (d) grasp an upright post 24 in one hand while depressing lock button 60 with the other hand to release the post from the housing; (e) repeat step (d) for the other post; (f) disassemble posts by grasping one segment 48 in each hand, and pulling segments apart, repeat for the other segments, arrange the segments so that they are substantially parallel with each other and store the disassembled post 24; (g) repeat step (f) for the other post; and (h) rotate foot 38 so that it is substantially parallel to housing 32 and store base 22.

A user can follow the following steps to transform banner stand 20 from collapsed mode 42 to erect upright mode 40: (a) remove base 22 from storage container and rotate foot 38 so that it is substantially perpendicular to housing 32; (b) remove post 24 from storage container assemble post 24 by inserting ends of segments 48 one into the other, bungee cord 50 will act to retain segments as assembled; (c) repeat step (b) for the other post; (d) insert post lower locking portion 46 into socket 62 until tab 68 engages with recessed portion 54; (e) repeat step (d) for the other post; and (f) grasp and pull crossbar 26 up towards upper portion 44 and engage prongs 84 into cavities 58.

When used herein, "substantially" includes precisely the characteristic or value identified. "Connect" and other forms of the word, does not require direct physical contact and intermediate components may be present.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

We claim:

1. A retractable banner stand assembly having an erect upright mode and a collapsed mode for transport, the banner stand assembly comprising:

a base for placement on a horizontal surface, the base comprising a generally tubular housing with a slit, a single banner wound on a single core and contained within the housing, the banner having a first side and a second side, the first side having a graphic disposed thereon, and the second side having a graphic disposed thereon, the banner extendable out of the housing through the slit, a retracting mechanism for winding the banner back onto the core when it has been extended, and a pair of end cap assemblies, each end cap assembly secured to the housing and supporting the core, each end cap assembly comprising a socket and a quick release locking mechanism engaged with the respective socket, and two posts insertable into and removable from the base, each of the two posts having a plurality of post segments and each of the posts insertable into the sockets in the end cap assemblies for the erect upright mode and removable from the sockets and separable from the base for the collapsed mode for transport, wherein the single banner is extendable from the base through the slit and may be supported by the posts when the two posts are inserted into the respective sockets, wherein the posts are then positioned to permit an unobstructed view of the graphic image disposed on the first side of the banner when viewed from a viewing position displaced from and directly in front of the first side of the banner, and an unobstructed view of the graphic image disposed on the second side of the banner when viewed from a viewing position displaced from and directly in front of the second side of the banner.

2. The retractable banner stand assembly of claim 1, wherein the housing is formed of extruded aluminum and the end cap assemblies are substantially formed of plastic.

3. The retractable banner stand assembly of claim 2, wherein each of the two end cap assemblies comprises an inner piece and an end piece and the quick release locking mechanism is secured in the end cap assembly intermediate the inner piece and the end piece, and wherein the posts each have a recess on a lower portion thereof that is engaged by the quick release locking mechanism when each post is inserted into a respective socket.

4. The retractable banner stand assembly of claim 2, wherein the banner is engaged with the two posts by way of a crossbar attached to a top edge of said banner, the crossbar having a pair of ends and the ends engaged with the top of the posts.

5. The retractable banner stand assembly of claim 4, wherein the crossbar comprises a pair of prongs positioned at the pair of ends, the tops of the posts have a pair of cooperating sockets, and the pair of end cap assemblies have a pair of cooperating sockets, whereby the pair of prongs are engaged in the tops of the posts when the banner stand assembly is in the erect upright mode and the pair of prongs are engaged in the eng cap assemblies when the banner stand assembly is collapsed for transport.

6. A retractable banner stand assembly comprising: a base with two ends for placement on a horizontal surface, the base comprising a housing and a single core contained within the housing, two posts separate from the base, insertable and removable from the base, one at each end of the base, the posts separated by a distance, and a single banner with two sides and a graphic image disposed on one side of the banner and a graphic image disposed on the other side of the banner, the single banner wound on a core in the base and contained within the base, the single banner extendable upwardly out from the base and then retractable back into the base, the single banner having a maximum width and supported by the posts when the banner is extended from the base, wherein the distance between the posts is greater than the maximum width of the banner, wherein the base further comprises two end cap assemblies, each end cap assembly including a socket for receiving the post and a quick release locking mechanism for capturing and releasing the respective posts.

7. The retractable banner stand assembly of claim 6, wherein each of the two end cap assemblies include an end piece and an inner piece and wherein the quick release locking mechanism is secured by and between both the inner piece and the end piece.

8. A retractable banner stand assembly comprising:

a base for placement on a horizontal surface, the base having two ends and comprising a housing, a single core contained within the housing, the core including a retracting mechanism for winding the banner back on the core after it has been extended, and a pair of an end cap assemblies, one end cap assembly at each end of the base, each end cap assembly comprising a socket and a quick release locking mechanism;

two posts separate from the base, insertable into each socket on each end cap assembly, whereby after insertion the posts are inserted into said sockets they are locked therein by the quick release locking mechanism and the extend upwardly, the posts releaseable for the sockets by actuating the quick release locking mechanisms; and a single banner with a side and an opposite side, a graphic image on the side and a graphic image on the opposite side, the banner wound on the core, retracted within the housing, and extendable upwardly from the base and then windable back on the core, the banner supportable by the upright posts when it is extended upwardly.

9. The retractable banner stand assembly of claim 8, wherein the base further comprises two end cap assemblies.

10. A retractable banner stand assembly comprising: a base for placement on a horizontal surface, the base comprising a housing and a single core contained within the housing, and a pair of upwardly facing sockets on two ends of the base, two upright posts extending from the base, each post having an upwardly facing socket, a single banner extending from the base, and a crossbar with a pair of ends and a downwardly extending prong on each end; wherein the banner extends upwardly from the base, the crossbar is attached to the upper edge of the banner, and the crossbar engages with, and is supported by the upwardly facing sockets of each of the upright posts; and wherein the banner is retractable into the housing whereby the prongs of the crossbar are insertable into the upwardly facing sockets on the two ends of the base, wherein the base further comprises two end cap assemblies, each end cap assembly comprising a quick release locking mechanism for retaining the posts in the base.

11. A retractable banner stand assembly comprising: a base for placement on a horizontal surface, the base comprising a housing and a single core contained within the housing, and a pair of upwardly facing sockets on two ends of the base, two upright posts extending from the base, each post having an upwardly facing socket, a single banner extending from the base, and a crossbar with a pair of ends and a downwardly extending prong on each end; wherein the banner extends upwardly from the base, the crossbar is attached to the upper edge of the banner, and the crossbar engages with, and is supported by the upwardly facing sockets of each of the upright posts; and wherein the banner is retractable into the housing whereby the prongs of the crossbar are insertable into the upwardly facing sockets on the two ends of the base, wherein each of sockets on the two ends of the base each include a the quick-release locking mechanism with a button to actuate the quick release locking mechanism for releasing the posts retained in the base.

* * * * *